March 9, 1926.
L. H. JUNKEN
1,576,195
SYSTEM FOR TRANSMITTING ANGULAR MOTION
Filed Sept. 14, 1925
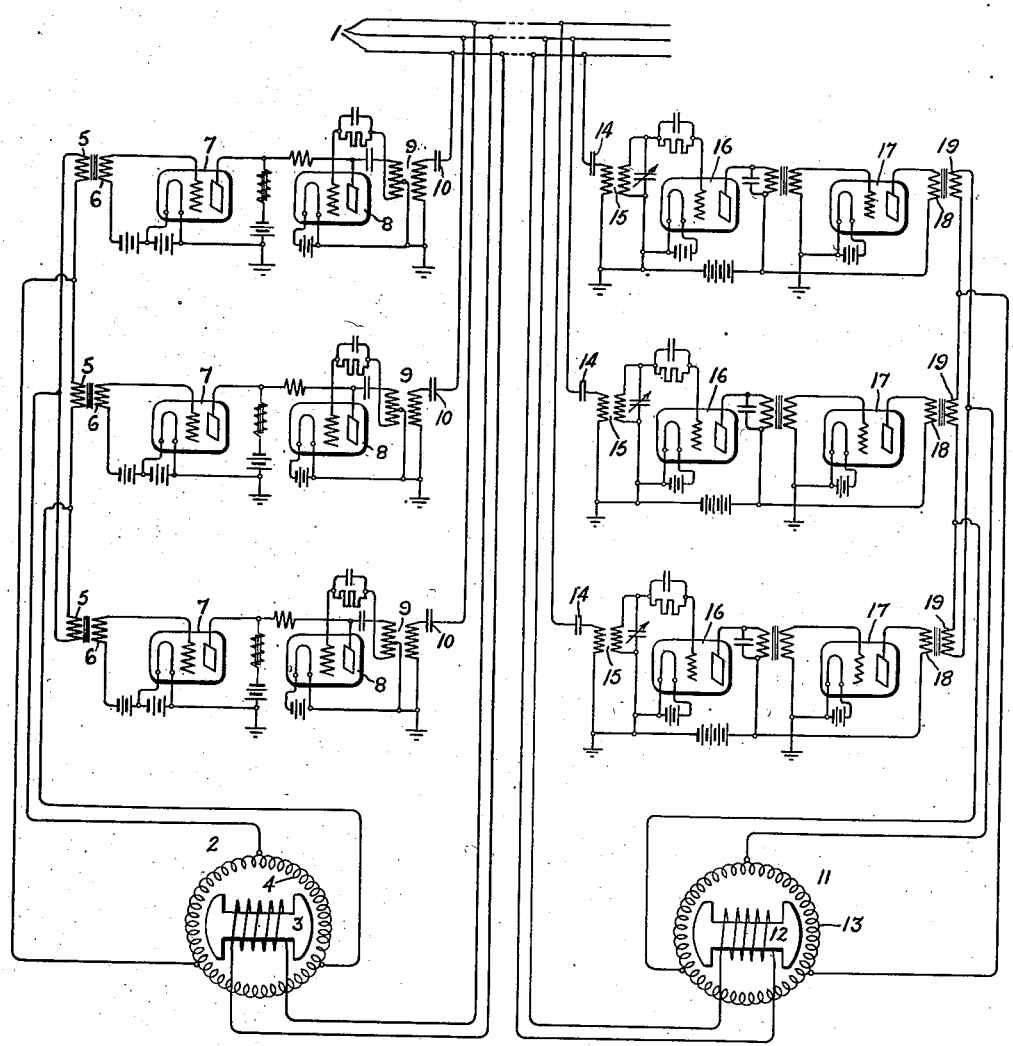
Inventor:
Lawrence H. Junken,
by *Alexander F. [signature]*
His Attorney.

Patented Mar. 9, 1926.

1,576,195

UNITED STATES PATENT OFFICE.

LAWRENCE H. JUNKEN, OF SCHENECTADY, NEW YORK, ASSIGNOR TO GENERAL ELECTRIC COMPANY, A CORPORATION OF NEW YORK.

SYSTEM FOR TRANSMITTING ANGULAR MOTION.

Application filed September 14, 1925. Serial No. 56,143.

*To all whom it may concern:*

Be it known that I, LAWRENCE H. JUNKEN, a citizen of the United States, residing at Schenectady, in the county of Schenectady, State of New York, have invented certain new and useful Improvements in Systems for Transmitting Angular Motion, of which the following is a specification.

My present invention relates to means for transmitting angular motion from a distant point, and more particularly to means for operating a remote receiver substantially in synchronism with the motion of a transmitter.

It is an object of my invention to provide means for controlling the synchronous operation of the remote receiver by means of carrier current, employing in this connection existing transmission systems.

The novel features which I believe to be characteristic of my invention are set forth with particularity in the appended claims. My invention itself, however, both as to its organization and method of operation will best be understood by reference to the following specification taken in connection with the accompanying drawing in which the figure shows diagrammatically a circuit organization whereby my invention may be carried into effect.

Referring to the drawing, I have indicated at 1 the mains of a three-phase system of distribution which may be supplied with energy from any suitable source, not shown. Associated with the distribution system is a transmitter 2 of the selsyn type having a field member 3 energized from one phase of the three-phase system. The polyphase stator winding 4 of the transmitter is connected at three equidistant points with a plurality of primary transformer windings 5. Inductively associated with windings 5 are a plurality of secondary transformer windings 6, connected to the grids of a plurality of modulator units 7.

The output circuit of each modulator unit 7 is connected with a carrier frequency generator 8 to supply modulating frequency energy thereto. Each generator 8 is connected to one conductor of the distribution system through a transformer 9, the secondary windings of transformer 9 being connected to the distribution system through blocking condensers 10 which serve to exclude power frequency energy from the transmitters. Each generator 8 operates on a different carrier frequency, the frequencies employed being far enough apart so that the receivers will not be affected by energy picked up along the transmission line from other conductors by condensive coupling.

The receiver 11, to which angular motion is to be transmitted, comprises a bipolar, rotary field member 12, and a stator armature winding 13 of polyphase form, the armature and field member of the receiver being similar in every respect with the armature and field member of the transmitter. The field member 12 is energized from the same phase of the distribution system as the field member 3 of the transmitter.

Stator 13 of the receiver is connected to the distribution system through blocking conductors 14 and a plurality of transformers 15, the secondary windings of which are connected to a plurality of detector units 16. The grid circuit of each detector is tuned to the carried frequency furnished by a corresponding transmitter 8. Each detector unit is connected with an amplifier 17 which in turn is connected to a primary transformer winding 18. Associated with windings 18 are a plurality of secondary transformer windings 19 which are connected with three equidistant points on the armature winding 13 of the receiver 11.

In the operation of the device, the electromotive forces induced in the secondary winding 4 of the transmitter 2 are supplied to transformers 5—6 and to the modulator units 7. The output circuits of modulators 7 are connected with the oscillation, or carrier frequency generators 8, and act to supply modulating frequency energy thereto. Modulated carrier frequency energy is now supplied to the distributing system by the generators 8 and transmitted to the receiving station. The carrier frequency energy is detected at 16, the modulating frequency energy being supplied to amplifiers 17 and thence to the primary transformer windings 18. If the transmitter and receiver rotors occupy the same relative position with respect to their associated stator members, the electromotive forces supplied to the primary windings 18 and secondary windings are equal and opposite and no current will flow from the transmitter to the receiver. If, however, the transmitter rotor is operated, the condition of balance will be disturbed and an equalizing current will flow from the transmitter stator to the receiver stator. The stator will now react with the receiver rotor and cause the latter to assume a position similar to that of the transmitter rotor, when a condition of balance will again be obtained.

While I have indicated at 1 the three mains of an alternating current power distribution system, it is obvious that any type of power transmitting or communication system may be employed if desired. It is further obvious that various changes may be made in the transmitter or receiver used in connection with this system without departing from the scope of my invention as set forth in the appended claims.

What I claim as new and desire to secure by Letters Patent of the United States is:—

1. In combination, a transmission system, a transmitter and a receiver connected to said system, the transmitter and receiver each including a polyphase stator winding and a polarized rotary member, the connections between one of the stator windings and the transmission system including a plurality of carrier frequency current generators.

2. In combination, a transmission system including a plurality of lines, a transmitter and a receiver associated with said system, means for transmitting angular motion from the transmitter to the receiver, said means including a plurality of carrier frequency generators connected to different lines of the transmission system, and means including the transmitter for supplying modulating frequency energy to the carrier frequency generators.

3. In combination, a transmission system including a plurality of lines, a transmitter and receiver associated with said system, the transmitter and receiver each including a polyphase armature and a polarized field member movable relatively to one another, means for transmitting angular motion from said transmitter to said receiver, said means including a plurality of carrier frequency generators connected to different lines of the transmission system, means including the transmitter for supplying modulating frequency energy to the carrier frequency generators, a plurality of detectors connected to the distribution system and tuned to the frequency of said carrier frequency energy and connections between the detectors and the receiver.

4. In combination, a transmission system including a plurality of lines, a transmitter and a receiver associated with said system, means for transmitting angular motion from the transmitter to the receiver, said means including a plurality of carrier frequency generators connected to different lines of the transmission system, each of the generators being adapted to supply a different frequency to its associated line and means including the transmitter for supplying modulating frequency energy to said carrier frequency generators.

5. In a device for transmitting angular motion, a relatively high frequency generator, a transmitter and a receiver associated with the generator, the transmitter and receiver each including a polyphase winding and a cooperating member, movable with respect to one another, means for supplying modulating frequency energy from the transmitter to the generator, and a connection between the generator and receiver whereby the movable member of the receiver may operate substantially in synchronism with the movable member of the transmitter.

6. In a device for transmitting angular motion, a relatively high frequency generator, a transmitter and a receiver associated with the generator, the transmitter and receiver each including a polyphase armature and a polarized field member movable with respect to one another, means for supplying modulating frequency energy from the transmitter to the high frequency generator, and a connection between the high frequency generator and the receiver, whereby the receiver may operate substantially in synchronism with the transmitter.

In witness whereof, I have hereunto set my hand this 10th day of September, 1925.

LAWRENCE H. JUNKEN.